United States Patent

Dalton et al.

Patent Number: 5,537,847
Date of Patent: Jul. 23, 1996

[54] ANTI-THEFT DEVICE FOR MOTOR VEHICLES

[76] Inventors: Michael Dalton, 20 Acorn Ave., Farmingville, N.Y. 11738; Michael Iannotta, 89 Henearly Dr., Miller Place, N.Y. 11764

[21] Appl. No.: 207,823

[22] Filed: Mar. 7, 1994

[51] Int. Cl.$^6$ .................................................. B60R 25/02
[52] U.S. Cl. .................................. 70/209; 70/226; 70/237
[58] Field of Search ........................... 70/209, 211, 212, 70/225, 226, 237, 238, 417; 74/552

[56] References Cited

U.S. PATENT DOCUMENTS

| | | | |
|---|---|---|---|
| 1,154,389 | 9/1915 | Fogalsang | 70/209 |
| 1,395,532 | 11/1921 | Tilden | 70/209 |
| 4,949,561 | 8/1990 | Solow et al. | 70/209 |
| 5,031,429 | 7/1991 | Wang | 70/209 |
| 5,199,284 | 4/1993 | Lin | 70/209 |
| 5,259,222 | 11/1993 | Jang | 70/209 |
| 5,297,406 | 3/1994 | Lin | 70/209 |
| 5,353,614 | 10/1994 | Anderson | 70/209 |
| 5,415,018 | 5/1995 | Ferrante | 70/209 |
| 5,454,240 | 10/1995 | Whitney | 70/209 |

FOREIGN PATENT DOCUMENTS

| | | | |
|---|---|---|---|
| 2487275 | 1/1982 | France | 70/237 |
| 2501134 | 9/1982 | France | 70/237 |
| 2520313 | 7/1983 | France | 70/237 |
| 1127524 | 9/1968 | United Kingdom | 70/226 |
| 2110175 | 6/1983 | United Kingdom | 70/226 |
| 2004211 | 3/1992 | WIPO | 70/209 |

*Primary Examiner*—Steven N. Meyers
*Assistant Examiner*—Suzanne L. Dino
*Attorney, Agent, or Firm*—Kelly & Hulme

[57] ABSTRACT

An anti-theft device for use in combination with the steering wheel of a motor vehicle comprising a cover member sized to completely cover the top of a motor vehicle steering wheel, said cover member further defining a slot therein said slot commencing at an edge of said cover. The device is further provided with a first hook member fixed to said cover member adjacent to the edge thereof said hook oriented and adapted to engage said wheel from the inside thereof; and an elongated member having a first outer end and a second inner end, said second end being adapted to be slideably engaged by said cover member slot. The elongated member further comprises a second hook member fixed to said elongated member at a point intermediate to said first and second end, said second hook member oriented and adapted to engage said wheel from the inside thereof. Finally, the device of the present invention is provided with locking means for locking the elongated member in a stationary position with respect to the cover member at any of a plurality of positions.

4 Claims, 4 Drawing Sheets

5,537,847

ANTI-THEFT DEVICE FOR MOTOR VEHICLES

BACKGROUND OF THE INVENTION

1. Field of the Invention.

The present invention pertains to the field of anti-theft devices for motor vehicles and more particularly to anti-theft devices which render the steering wheel of a motor vehicle inoperable.

2. Description of the Prior Art.

The theft of motor vehicles in the United States has reached epidemic proportions. As a result, there have been proposed many different devices to prevent such theft. These devices include electronic lock-out devices requiring secret codes before the motor vehicle may be started, devices that interrupt gas flow or the electrical circuitry of the engine, and devices that are affixed to some part of the motor vehicle which prevents operation thereof, even if the vehicle is started. In the latter class of devices, one popular method is affixing a device to the steering wheel of the motor vehicle, which device prevents the steering wheel and therefore the car from being operated in a manner useful to the would be thief.

A device illustrative of this class, known popularly as THE CLUB (TM), is shown in U.S. Pat. No. 4,856,308 to Johnson. This device is comprised of an elongated shaft which may be lockably affixed to a steering wheel and extends beyond the periphery thereof, such that full rotation of the wheel is limited by the engagement of the elongated tube with an interior surface of the motor vehicle.

While the Johnson device is functional, it and others like it, include several undesirable features. For example, since the Johnson device does not protect the outer perimeter of the steering wheel, the Johnson device is easily removed by cutting through the outer perimeter of the steering wheel and sliding the device off of the steering wheel through the cut. In addition, the there are no features in the Johnson type devices to prevent access to the steering wheel mounting mechanism. Therefore, a would be thief could remove the steering mechanism in its entirety and replace it allowing full operation of the motor vehicle steering. Furthermore, due to the material thinness of the elongated shaft which forms the basis of this type of device, a portion of the shaft may be frozen by exposure to liquid nitrogen or some similar freezing agent. Thereafter, due to the brittle nature of the material after freezing, the shaft can be snapped in half. Finally, there are various "pinch points" on this type of device which can cause injury to a user.

It is therefore an object of the present invention to provide a device that prevents or reduces the likelihood of theft of a motor vehicle.

It is yet another object of the present invention to provide a device which engages the steering wheel of a motor vehicle such that said steering wheel is inoperable.

It is still another object of the present invention to provide a device that may be easily installed and removed.

It is still another object of the present invention to provide a device that, when installed, will prevent access to the steering wheel such that same may not be removed, altered or otherwise damaged.

These and other objects of the present invention shall become apparent from the following specification, read in conjunction with the appended claims and attached drawings.

SUMMARY OF THE INVENTION

In accordance with the teachings of the present invention, there is herein described and illustrated an anti-theft device for use with a motor vehicle comprising a cover member sized to completely cover the top of a motor vehicle steering wheel, said cover member further defining a slot therein said slot commencing at an edge of said cover. The device is further provided with a first hook member fixed to said cover member adjacent to the edge thereof, said hook oriented and adapted to engage said wheel from the inside thereof; and an elongated member having a first outer end and a second inner end, said second end being adapted to be slideably engaged by said cover member slot. The elongated member further comprises a second hook member fixed to said elongated member at a point intermediate to said first and second end, said second hook member oriented and adapted to engage said wheel from the inside thereof. Finally, the device of the present invention is provided with locking means for locking the elongated member in a stationary position with respect to the cover member at any of a plurality of positions.

DETAILED DESCRIPTION OF THE INVENTION

Figure 1:
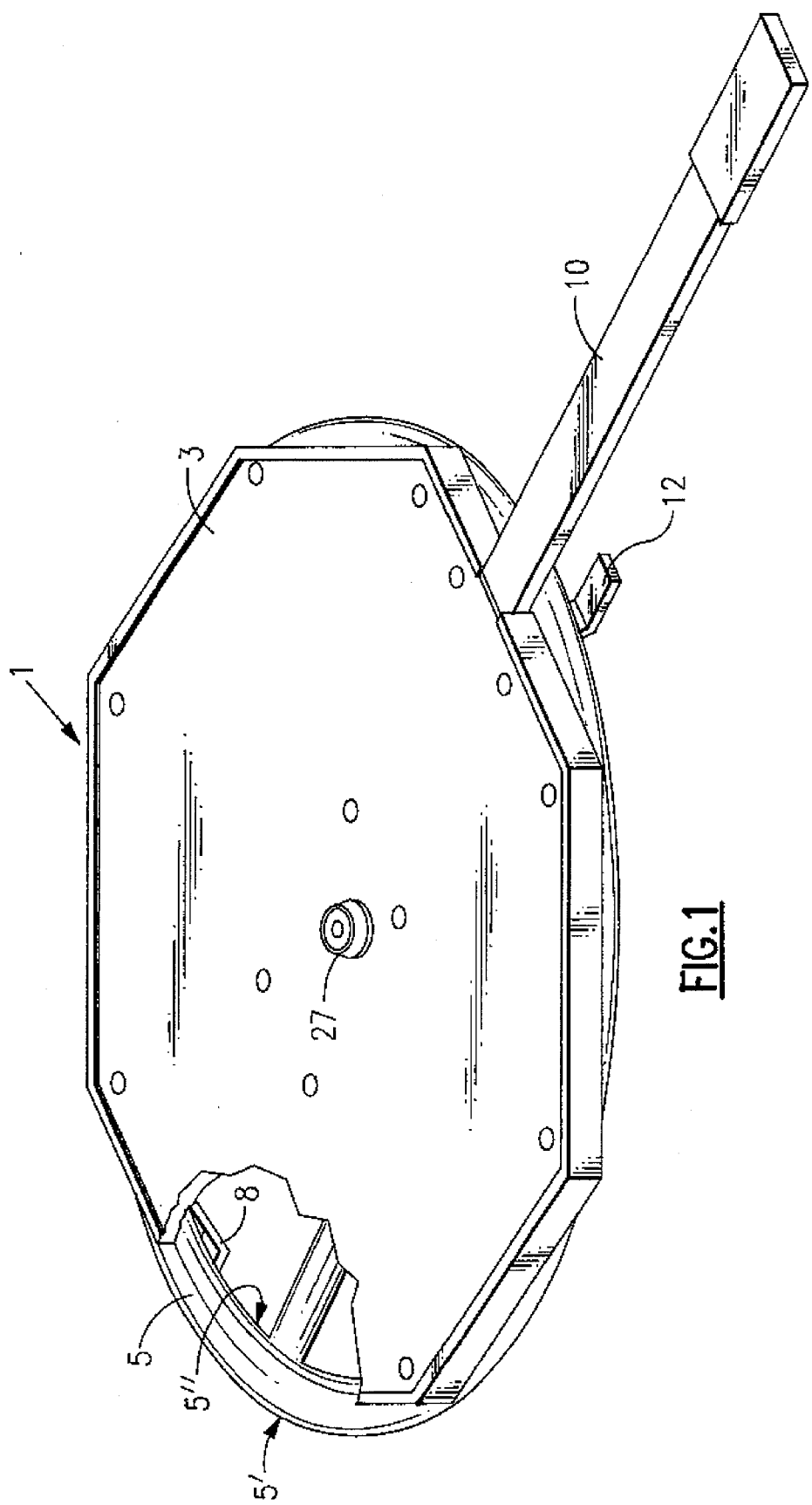
FIG. 1 is a partially broken-away perspective view of the present invention showing it installed on a steering wheel.
Figure 2:
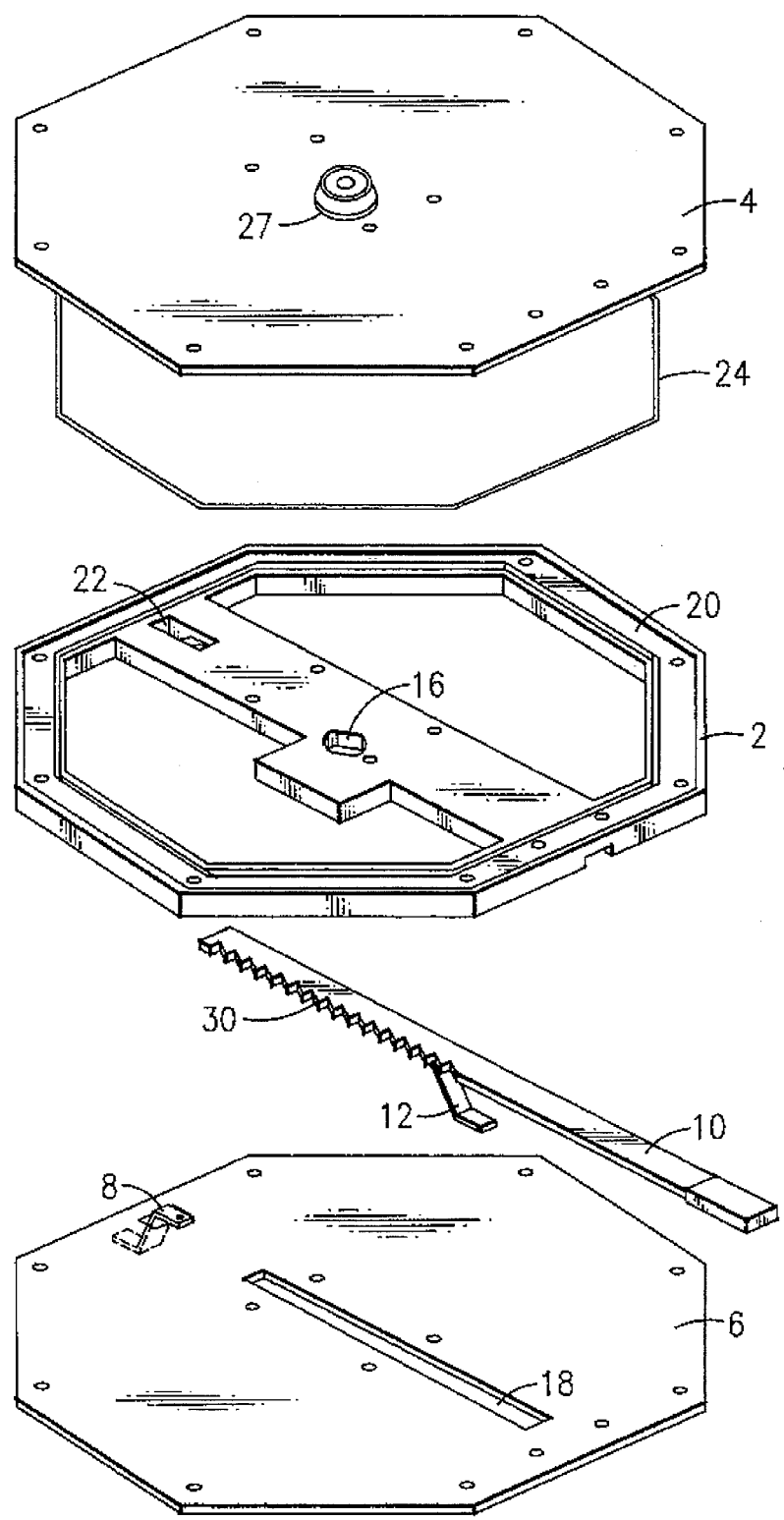
FIG. 2 an exploded view of the device of FIG. 1.
Figure 3:
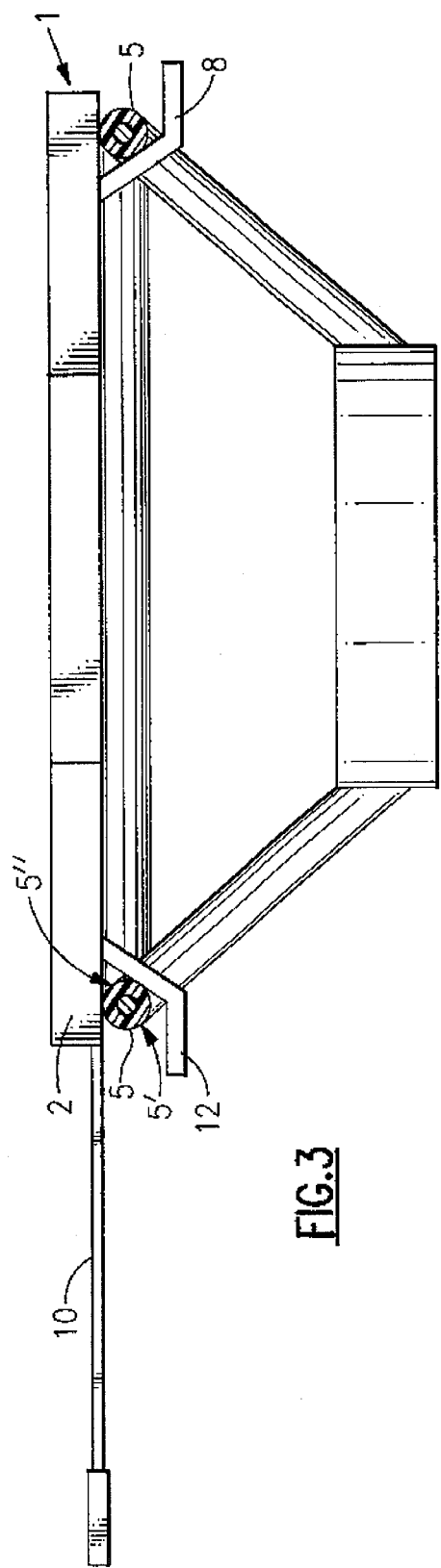
FIG. 3 is a side view of the device of FIG. 1.
Figure 4:
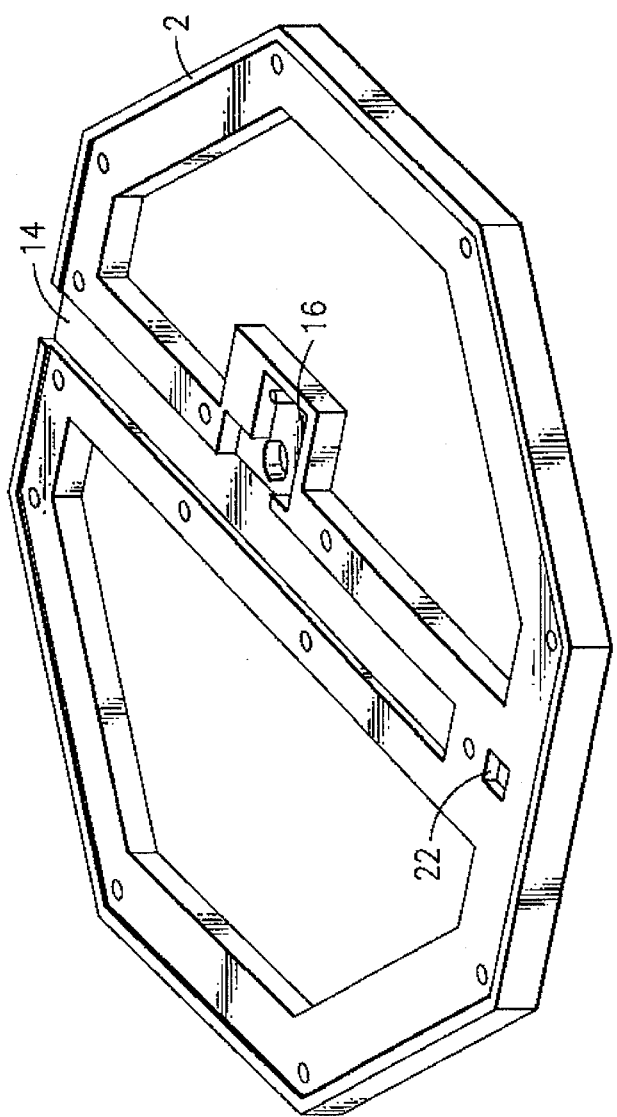
FIG. 4 is a top perspective view of the central plate used in the device of FIG. 1.
Figure 5:
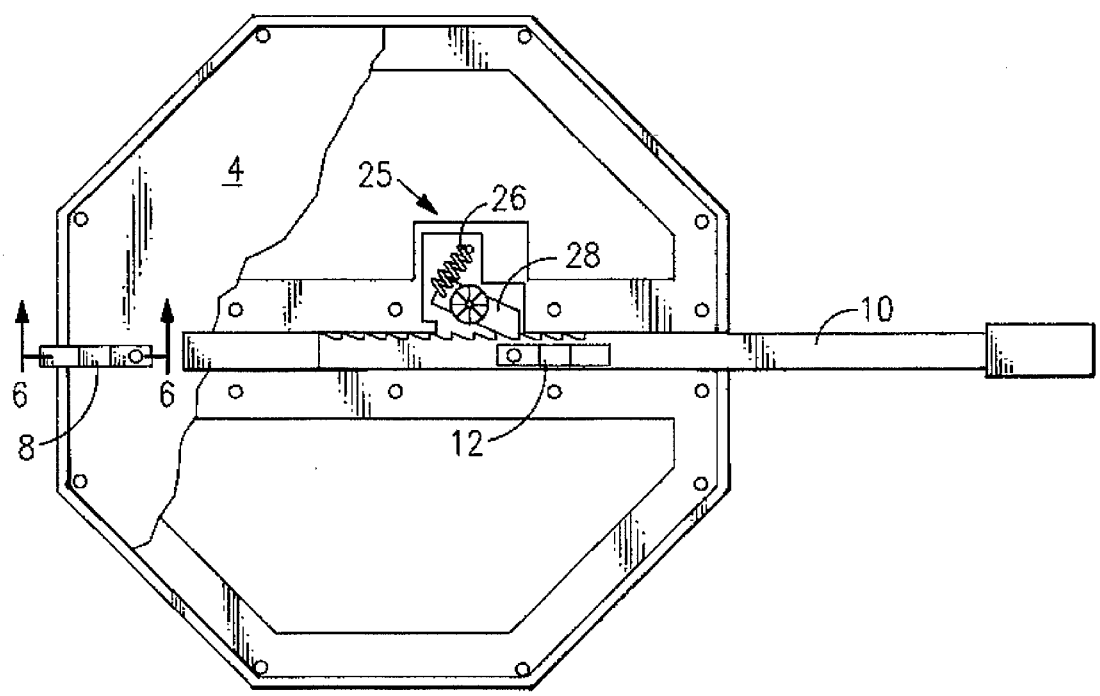
FIG. 5 is a top partially broken away view of the device of the present invention.
Figure 6:
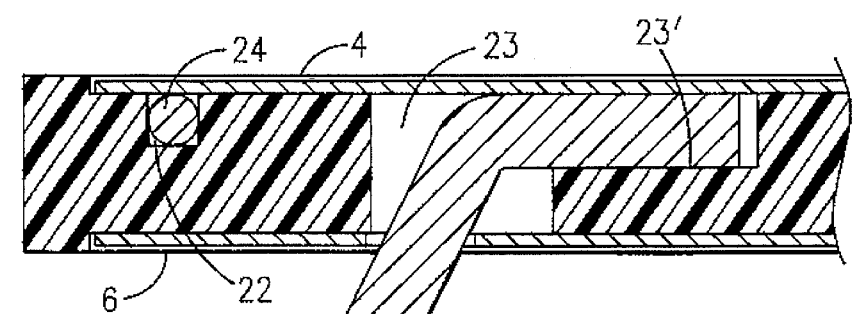
FIG. 6 is a side view of the fixed hook and security rod used in the device of FIG. 1.

Referring now to the drawing, an anti-theft device is shown according to the present invention. This device 1 is designed to prevent the operation of the steering wheel 5 of a motor vehicle when same is installed thereon such that the motor vehicle may not be operated, thereby discouraging "would be" motor vehicle thieves.

The steering wheel 5 most advantageously used in combination with the device of the present invention is that typically found in most automobiles on the road today. As depicted in the attached drawings, the steering wheel 5 comprised of a circular wheel member having generally a circular cross section and further having an outside perimeter 5 and inside perimeter 5.

With the above in mind, the device 1 of the present invention has a cover member 3 which is sized and shaped to completely cover a steering wheel 5 of a motor vehicle, a first hook member 8 fixed adjacent to one edge of said cover member 3, an elongated member 10 slideably engageable within said cover 3, a second hook member 12 fixed to said elongated member 10 intermediate to the elongated members length. The elongated member 10, when engaged by the cover member 3 is oriented such that the second hook 12 extends out of said cover member 3 on the same side as said first hook 8. In addition, when the elongated member 10 is engaged by the cover member 3 the hooks are oriented and adapted to engage said steering wheel 5 from the inside thereof.

The device 1 is further comprised of means for locking 25 said elongated member 10 within said cover member 3 stationary at any of a plurality of positions. In this way the device 1 of the present invention may accommodate steering wheels of many different shapes and sizes.

In a preferred embodiment of the present invention, the cover member 3 is comprised of a central plate 2, a top plate 4 and a bottom plate 6. The central plate 2 defines a elongated member receiving slot 14 which extends from an outer edge of central plate 2 and to a point internal to the central plate 2. This slot 14 receives the above-referenced elongated member 10 and is sized and shaped such that elongated member 10 may slide in and out thereof. In a preferred embodiment, the slot is oriented such that is passed through and beyond the axial center of the central plate 2.

In addition, the central plate 2 define an opening 16 adjacent to and in communication with said slot 14 along a portion thereof. The opening 16 is provided to accommodate the above-described means for locking 25 said elongated member 10 in place and will be described in more detail below.

Finally, the central plate 2 defines an opening 22 for engaging the first hook 8 fixedly to the device 1. This opening is formed by a first hole 23 which extends completely through said central member and a second hole 23' adjacent to said first hole 23 which extends partially through said central plate 2. The first hook member 8 is provided with a central plate engaging portion 9 such that the first hook 8 may extend through first hole 23 such that said plate engaging portion 9 is fixed in and engaged by said second hole 23'. The engaging portion 9 of hook 8 is engaged in said opening 22 by any known means including but not limited to welding, gluing, fasteners and the like.

As described above, the device 1 is provided with locking means 25 disposed within lock opening 16. This locking means is comprised of a conventionally known key lock 26 and a tumbler member 28 operationally joined to such key lock 26. When the key lock 26 is operated by a key the tumbler member 28 may be selectively engaged with and dis-engaged from staggered teeth 30 defined along a portion of the length of said elongated member 10 thereby allowing the elongated member 10 to be fixed or to slide within the cover member 2.

Finally, the device 1 of the present invention is provided with a top cover member 4 and a bottom cover member 6 fixed to and disposed on opposite sides of the central member 2. The purpose of these covers is to protect the operative portions of the device 1 and also to provided a clean appearance to the overall device. The cover members 4 and 6 define slots and openings therein to accommodate the hook 12 fixed to the moveable elongated member 10 (slot 18) and the key lock 26 (opening 27).

In the preferred embodiment of the present invention of the present invention, the central plate 2 also defines a slot 20 adjacent to and around the perimeter thereof, which slot receives a metal rod 24 extending the entire length of the slot. The rod 24, which can spin freely within the slot, is provided to prevent the device 1 of the present invention from being sawn off the steering wheel. If someone attempts to remove the device by sawing same, the saw blade will hit the rod 24 which is formed of a sufficiently hard material to resist cutting. In addition, the rod 24 when hit by a saw blade will tend to spin within the slot 20 thereby inhibiting further cutting of the device.

The device 1 of the present invention may be construct of any suitable metal or plastic as long as the material chosen has the necessary mechanical qualities to meet the device requirements specified herein. However, in a preferred embodiment, the central plate 2 and covers 4 and 6 are formed from a hard plastic such as polyethylene, polycarbonate or the like; the rod 24 is preferably formed from hardened or tempered steel; and the stationary hook 8 and elongated member 10 are formed from hardened steel, tempered steel or the like.

In operation, the device 1 is place over the top of a steering wheel 5 with the elongated member 10 slid completely within said cover member 3 and the fixed hook 8 positioned to engage a portion of said steering wheel 5 from the inside perimeter 5 thereof. The elongated member 10 is then slid out of cover member 10 until hook 12 engages a diametrically opposite portion of steering wheel 5 from the inside perimeter 5 thereof. The key lock 27 is then operated, through the use of a key or other like device, causing tumbler member 28 to engages one of the many staggered teeth 30 provided in the elongated member 10 thereby preventing the elongated member 10 from moving until the lock means 25 is operated again causing the tumbler member 28 to disengage from the elongated member.

While various embodiments of the present invention have been disclosed above, it will be recognized by those skilled in the art that modifications of the present invention may be made without departing from the scope of the present invention. Therefore, the limits of the present invention are to be determined in view of the claims which follow.

What is claimed is:

1. An anti-theft device for use in association with a steering wheel of a motor vehicle having a circular member and having an inside and outside perimeter comprising:

a cover member adapted to completely cover the top of a motor vehicle steering wheel, said cover member further defining a cover member slot therein said cover member slot commencing at an edge of said cover;

a first hook member fixed to said cover member adjacent to the edge thereof, said first hook member oriented and adapted to engage said wheel from the inside perimeter thereof;

an elongated member having a first outer end and a second inner end, said second inner end being adapted to be slideably engaged within said cover member slot;

a second hook member fixed to said elongated member at a point intermediate to said first outer end and second inner end, said second hook member extending out of said cover through said slot and oriented and adapted to engage said wheel from the inside perimeter thereof;

locking means within said cover member which engages and locks said elongated member in a stationary position with respect to said cover member.

2. The device of claim 1 wherein said locking means may engage said elongated member in a fixed location at any of a plurality of positions.

3. An anti-theft device for use in association with a steering wheel of a motor vehicle comprising:

a cover member adapted to completely cover the top of a motor vehicle steering wheel, said cover formed from a central plate, the central plate defining an elongated member receiving slot which extends from an outer edge of said central plate and into a point internal to the central plate; a top plate disposed over and fixed to one side of said center plate; and a bottom plate disposed over and fixed to the opposite side of said center plate, said bottom plate also defining a slot therein in communication with said central plate slot;

a first hook member fixed to said bottom plate adjacent to an edge thereof said first hook member oriented and adapted to engage said wheel from the inside perimeter thereof;

an elongated member having a first outer end and a second inner end, said second inner end being adapted to be slideably engaged within said center plate slot, said central plate slot receiving said elongated member and being sized and shaped such that said elongated member may slide in and out thereof;

a second hook member fixed to said elongated member at a point intermediate to said first outer end and second inner end and extending out from said bottom plate slot, said second hook member oriented and adapted to engage said wheel from the inside perimeter thereof; and locking means within said cover member which engages and locks said elongated member in a stationary position with respect to said cover member.

4. The device of claim 3 wherein said central plate slot is oriented such that said central plate slot passes through and beyond an axial center of the central plate.

* * * * *